United States Patent [19]

Kuan

[11] Patent Number: 5,232,291
[45] Date of Patent: Aug. 3, 1993

[54] AXLE CARRIER PINION BEARING LUBE RETURN

[75] Inventor: Chia-Liu Kuan, Yung-Ho, Taiwan

[73] Assignee: Dana Corporation, Toledo, Ohio

[21] Appl. No.: 843,826

[22] Filed: Feb. 28, 1992

[51] Int. Cl.⁵ .............. F16C 33/66; F01M 11/02; F16H 57/04
[52] U.S. Cl. .................. 384/473; 74/467; 184/11.1; 384/462
[58] Field of Search .......... 384/462, 465, 472, 473, 384/403, 404, 414; 74/467, 417; 184/11.1

[56] References Cited

U.S. PATENT DOCUMENTS

| | | |
|---|---|---|
| 1,631,217 | 6/1927 | Matthews . |
| 2,240,118 | 4/1941 | Matthews . |
| 2,368,963 | 2/1945 | Boden . |
| 3,383,937 | 5/1968 | Toenne et al. ............ 74/467 |
| 4,231,266 | 11/1980 | Nishikawa et al. ........ 74/467 |
| 4,271,717 | 6/1981 | Millward et al. ......... 184/11.1 X |
| 4,359,142 | 11/1982 | Schultz et al. ........... 74/467 X |
| 4,612,818 | 9/1986 | Hori et al. ............... 74/467 |
| 4,656,885 | 4/1987 | Hori et al. ............... 74/467 |
| 4,824,264 | 4/1989 | Hoebel .................... 384/473 |
| 4,952,077 | 8/1990 | Kurt ....................... 384/462 |

Primary Examiner—Thomas R. Hannon
Attorney, Agent, or Firm—Marshall & Melhorn

[57] ABSTRACT

A lubricating device for the inboard and outboard pinion bearings of a carrier comprises a pair of offset angularly disposed deflectors disposed within the carrier adjacent to the pinion shaft. One deflector is located in the lower portion of the carrier adjacent to the outboard pinion bearing and is angled to direct the flow of lubricant toward the inboard pinion bearing, while another deflector is in the upper portion of the carrier adjacent to the inboard pinion bearing and is angled to direct the flow of lubricant toward the outboard pinion bearing. The carrier lubricant is thereby directed along a generally one-way fluid path, minimizing the direct recirculation of high temperature oil through the outboard pinion bearing.

15 Claims, 2 Drawing Sheets

AXLE CARRIER PINION BEARING LUBE RETURN

BACKGROUND OF THE INVENTION

1. Field of the Invention

The invention relates to the lubrication of vehicle axle carrier pinion bearings and, more particularly, to a structure for controlling the flow of lubricant through the pinion bearings in a vehicle axle carrier.

2. Summary of Related Art

In operation, axle carrier pinion bearings are generally lubricated with oil which is circulated from a sump or reservoir by a drive gear through a passage located between the inboard and outboard pinion bearings. Oil entering the passage between the pinion bearings is typically drawn into and through both the inboard and outboard pinion bearings. The oil flowing through the outboard pinion bearing is directed back into the passage between the pinion bearings. From this passage, some of the oil is drawn into the inboard pinion bearing for return to the sump, while the remainder of the oil is recirculated directly through the outboard pinion bearing.

As it is circulated through the bearings the temperature of the oil tends to increase, and the recirculation of high temperature oil directly through the outboard pinion bearing disadvantageously causes a significant temperature difference between the oil in the outboard pinion bearing and the oil in the sump. Additionally, the oil may drain from the outboard pinion bearing if the associated vehicle is parked on a sufficiently steep incline, resulting in an initial period of operation without lubrication upon startup.

SUMMARY OF THE INVENTION

The present invention relates to a structure for controlling the flow of lubricant through the pinion bearings in a vehicle axle carrier. The lubricating device for the pinion bearings comprises a housing having an upper portion and a lower portion; a pinion including a pinion shaft rotatably mounted in said housing by spaced apart inboard and outboard pinion bearings; One deflector means disposed adjacent said outboard pinion bearing in the lower portion of said housing for directing the flow of lubricant toward said inboard pinion bearing; and another means disposed adjacent said inboard pinion bearing in the upper portion of said housing for directing the flow of lubricant toward said outboard pinion bearing.

The carrier lubricant is thereby directed along a generally one-way fluid path from the housing to and through the outboard pinion bearing, through the inboard pinion bearing and back to the housing. This minimizes the direct recirculation of high temperature oil through the outboard pinion bearing. Additionally, a reservoir is provided adjacent the outboard pinion bearing which maintains oil in the outboard pinion bearing regardless of the angular disposition of the associated vehicle.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
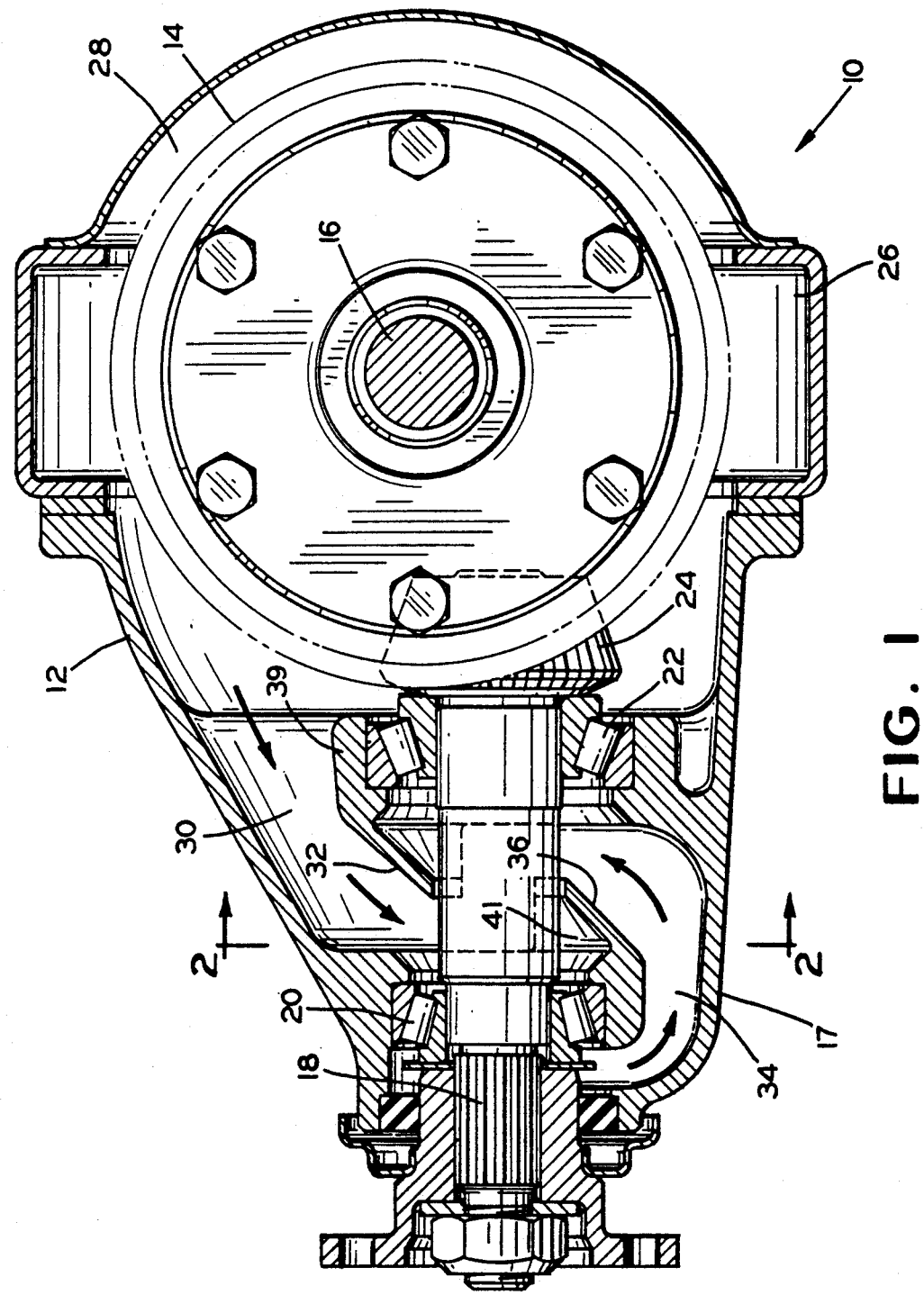
FIG. 1 is a vertical cross section through an axle carrier embodying the pinion bearing lube return of the present invention.

Referring now to the drawings, there is illustrated in FIG. 1 a vehicle axle carrier 10 including a housing 12 in which is mounted a drive gear 14 connected to an output element such as vehicle axle 16. In a forward extension 17 of the housing 12 is a pinion shaft 18 connected to an input such as a drive shaft (not shown) and rotatably mounted within an outboard pinion bearing 20 and an inboard pinion bearing 22. The pinion shaft 18 carries a bevel pinion 24 for engagement with drive gear 14.

The lower portion of the housing 12 is provided with a lubricant sump 26 which is in communication with a channel 28 provided between the outer periphery of the drive gear 14 and the inner wall of the housing 12. In the upper portion of the forward extension 17 of the housing 12 there is formed a passage 30 providing a lubricant pathway from the channel 28 to a cavity disposed between the outboard pinion bearing 20 and the inboard pinion bearing 22. The passage 30 is defined by the forward extension 17 and a first deflector 32 disposed adjacent the inboard pinion bearing 22 and the pinion shaft 18 in the upper portion of the forward extension 17. The first deflector 32 is angled downwardly and outwardly toward the outboard pinion bearing 20.

Another passage 34 is formed in the lower portion of the forward extension 17 which provides a lubricant pathway from the outboard side of the outboard pinion bearing 20 to the cavity between the outboard pinion bearing 20 and the inboard pinion bearing 22. The passage 34 is defined by the inner wall of the forward extension 17 and a second deflector 36 disposed adjacent the outboard pinion bearing 20 and the pinion shaft 18 in the lower portion of the forward extension 17. The second deflector 36 is angled upwardly and inwardly toward the inboard pinion bearing 22.

Figure 2:
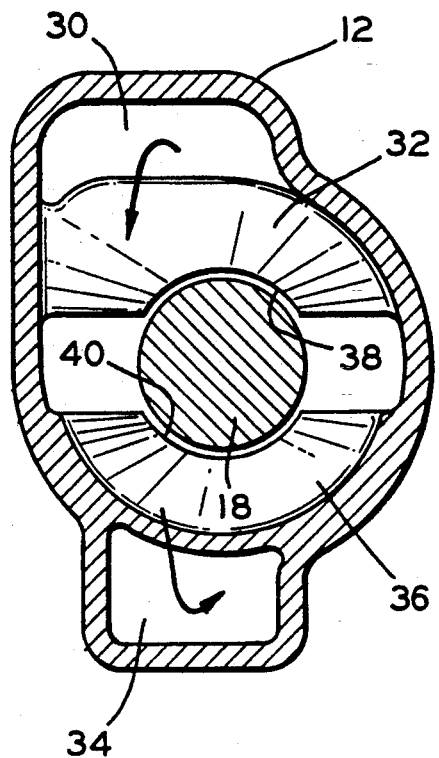
FIG. 2 is a sectional view taken substantially along line 2—2 of FIG. 1.

As best seen in FIG. 2, the first deflector 32 adjoins the inner wall of the upper portion of the forward extension 17 of the housing 12 at both ends. The edge of the first deflector 32 adjacent the pinion shaft 18 is provided with an inwardly curved portion 38 substantially following the periphery of the pinion shaft 18 and determining a gap therebetween. The size of the gap between the pinion shaft 18 and the first deflector 32 controls the distribution of the lubricant flowing through the inboard and outboard pinion bearings, 20 and 22. The first deflector 32 extends downwardly and outwardly toward the outboard pinion bearing 20, and is preferably affixed to or formed as an extension of a casing 39 retaining the inboard pinion bearing 22.

The second deflector 36 adjoins the inner wall of the lower portion of the forward extension 17 of the housing 12 along its lowermost edge. The second deflector 36 extends upwardly and inwardly toward the inboard pinion bearing 22, and is provided with an inwardly curved portion 40 spaced from and substantially following the periphery of the pinion shaft 18 so as to define a gap therebetween. The size of the gap between the pinion shaft 18 and the second deflector 36 controls the distribution of the lubricant flowing through the inboard and outboard pinion bearings, 20 and 22. The upper surface of the second deflector 36 preferably defines a reservoir 41 in communication with the outboard pinion bearing 20.

The first deflector 32 and the second deflector 36 may be formed integrally with the housing 12 as a single unit. The distal end of both the first and second deflectors, 32 and 36, may be machined to provide the desired gap between the first and second deflectors, 32 and 36, and the pinion shaft. The size of these gaps determines the flow distribution of the lubricant through the inboard and outboard pinion bearings, 20 and 22.

Figure 3:
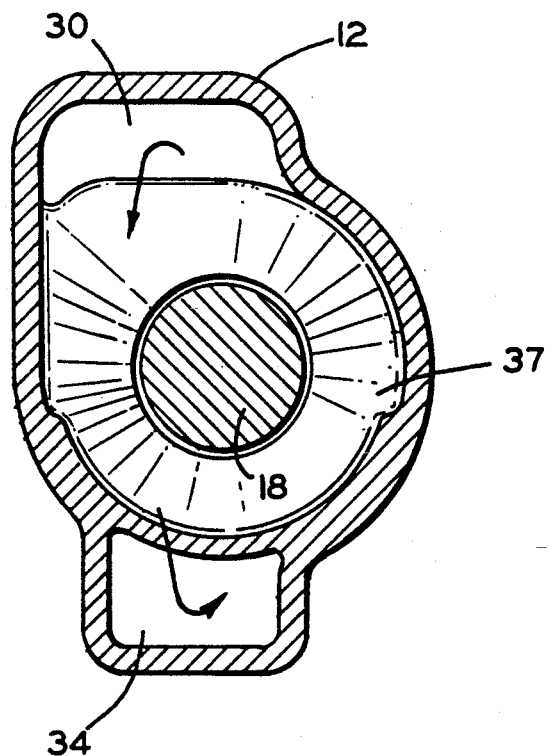
FIG. 3 is a view similar to FIG. 2 of an alternate embodiment of the invention.

Alternatively, it is contemplated the deflectors 32 and 36 may be formed independently and subsequently affixed to the housing 12. In the latter instance, the deflectors 32 and 36 may be formed of any suitable material such as, for example, metal, rubber or plastic. Polytetrafluoroethylene has been found to be a suitable material. The first and second deflectors may be formed of an integral, one piece deflector 37, shown in FIG. 3. This one piece deflector 37 may be adapted to be press fit into the housing 12.

In operation of the axle carrier 10, the housing 12 will contain a quantity of lubricant sufficient to fill the sump 26 and immerse the lowermost part of the drive gear 14. The lubricant will typically be a lubricating oil conventionally employed for such purposes. Upon rotation of the drive gear 14, the lubricant is carried upwardly from the sump 26 by the drive gear. From the drive gear 14, the lubricant travels through the passage 30 as indicated by the arrows in FIG. 1, where the lubricant is directed by the first deflector 32 towards the outboard pinion bearing 20. The lubricant is drawn through the outboard pinion bearing 20 and enters the passage 34. Lubricant exiting the outboard pinion bearing 20 and travelling through the passage 34 is directed by the second deflector 36 towards the inboard pinion bearing 22. The lubricant is drawn through the inboard pinion bearing 22, after which it is delivered back to the sump 26 formed in the lower portion of the housing 12.

The first deflector 32 thus directs a substantial portion of the lubricant delivered from the sump 26 by the drive gear 14 to the outboard pinion bearing 20, limiting the amount of lubricant which circulates through only the inboard pinion bearing 22 before returning to the sump 26. Likewise, the second deflector 36 directs a substantial portion of the lubricant exiting the outboard pinion bearing 20 to the inboard pinion bearing 22. The second deflector 36 thereby limits the amount of lubricant which recirculates directly through the outboard pinion bearing 20. Such limitation is clearly advantageous inasmuch as lubricant which is immediately recirculated through the outboard pinion bearing 20 attains a higher temperature than the remaining lubricant within the carrier 10.

Additionally, the second deflector 36 forms a reservoir 41 for the outboard pinion bearing 20 when the associated vehicle is parked. The second deflector 36 prevents lubricant from draining from the outboard pinion bearing 20 where the vehicle is parked on an incline and the forward extension 17 is thereby tilted upward relative to the rest of the housing 12.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A vehicle axle carrier including pinion bearings and a lubricating device for the pinion bearings comprising:
   a) a housing having an upper portion and a lower portion;
   b) a pinion including a pinion shaft rotatably mounted in said housing by spaced apart inboard and outboard pinion bearings;
   c) first deflector means disposed adjacent said inboard pinion bearing in the upper portion of said housing for directing the flow of lubricant toward said outboard pinion bearing; and
   d) second deflector means disposed adjacent said outboard pinion bearing in the lower portion of said housing for directing the flow of lubricant toward said inboard pinion bearing.

2. A vehicle axle carrier as defined in claim 1, wherein said first deflector means disposed adjacent said inboard pinion bearing is angled outwardly and downwardly toward said outboard pinion bearing.

3. A vehicle axle carrier as defined in claim 1, wherein said second deflector means disposed adjacent said outboard pinion bearing is angled upwardly and inwardly toward said inboard pinion bearing.

4. A vehicle axle carrier as defined in claim 3, wherein said second deflector means forms a lubricant reservoir in communication with said outboard pinion bearing.

5. A vehicle axle carrier as defined in claim 1, where said first deflector means and said second deflector means are formed of a polymeric material.

6. A vehicle axle carrier as defined in claim 5, wherein said polymeric material is polytetrafluoroethylene.

7. A vehicle axle carrier as defined in claim 1, wherein said first deflector means and said second deflector means are formed as an integral, one piece deflector.

8. A vehicle axle carrier as defined in claim 7, wherein said one piece deflector is formed of a polymeric material.

9. A vehicle axle carrier as defined in claim 8, wherein said polymeric material is polytetrafluoroethylene.

10. A vehicle axle carrier including pinion bearings and a lubricating device for the pinion bearings comprising:
    a) a housing having an upper portion and a lower portion;
    b) a pinion including a pinion shaft rotatably mounted in said housing by spaced apart inboard and outboard pinion bearings;
    c) deflector means having a first portion thereof disposed adjacent said inboard pinion bearing in the upper portion of said housing for directing the flow of lubricant toward said outboard pinion bearing and a second portion thereof disposed adjacent said outboard pinion bearing in the lower portion of said housing for directing the flow of lubricant toward said inboard pinion bearing.

11. A vehicle axle carrier as defined in claim 10, wherein said deflector means is comprised of a one piece deflector.

12. A vehicle axle carrier as defined in claim 10, wherein said one piece deflector is formed of a polymeric material.

13. A vehicle axle carrier as defined in claim 10, wherein said one piece deflector is formed of polytetrafluoroethylene.

14. A vehicle axle carrier including pinion bearings and a lubricating device for the pinion bearings comprising:
   a) a housing having an upper portion and a lower portion;
   b) a pinion including a pinion shaft rotatably mounted in said housing by spaced apart inboard and outboard pinion bearings;
   c) a first deflector disposed adjacent said inboard pinion bearing in the upper portion of said housing and angled downwardly and outwardly toward said outboard pinion bearing to direct the flow of lubricant toward said outboard pinion bearing; and
   d) a second deflector disposed adjacent said outboard pinion bearing in the lower portion of said housing and angled upwardly and inwardly toward said inboard pinion bearing to direct the flow of lubricant toward said inboard pinion bearing, said second deflector forming a lubricant reservoir in communication with said outboard pinion bearing.

15. In an axle carrier including a housing having an upper portion and a lower portion, a sump formed in the lower portion of the housing for containing a reservoir of lubricant, a pinion having a pinion shaft rotatably mounted in the housing by means of an inboard pinion bearing and an outboard pinion bearing, a device for controlling the flow of lubricant to the pinion bearings comprising:
   a) a first deflector disposed in the upper portion of the housing adjacent the inboard pinion bearing and the pinion shaft, said first deflector inclining downwardly in the direction of the outboard pinion bearing; and
   b) a second deflector disposed in the lower portion of the housing adjacent the outboard pinion bearing and the pinion shaft, said second deflector inclining upwardly toward the inboard pinion bearing;
   whereby said first and second deflectors direct the flow of lubricant through a generally one-way fluid path from the sump to the outboard pinion bearing, through the inboard pinion bearing and back to the sump.

* * * * *